July 25, 1944.   A. E. WATERMAN   2,354,292
VENTILATING SYSTEM FOR POSITIVE AIR CONTROL IN BUILDINGS
Filed June 23, 1941   3 Sheets-Sheet 3

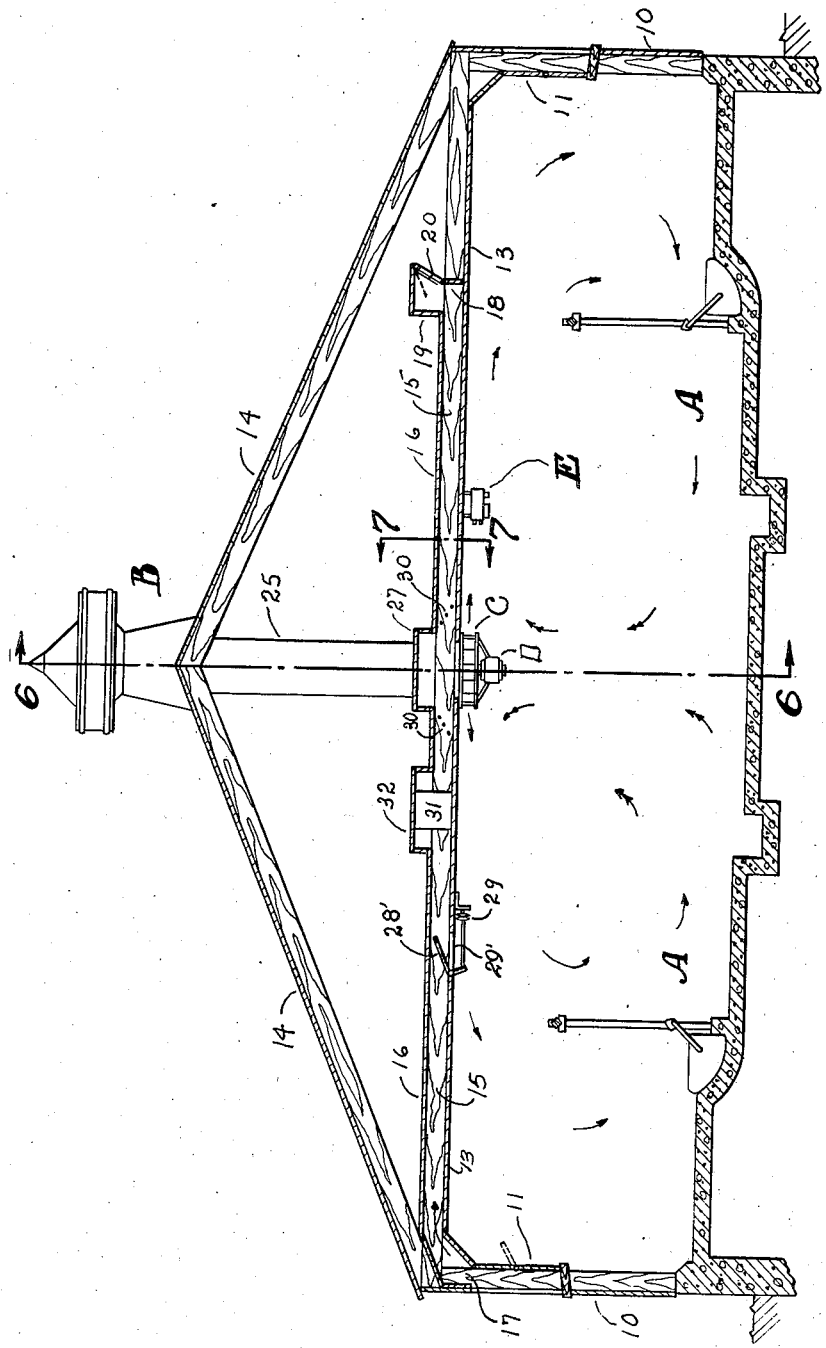

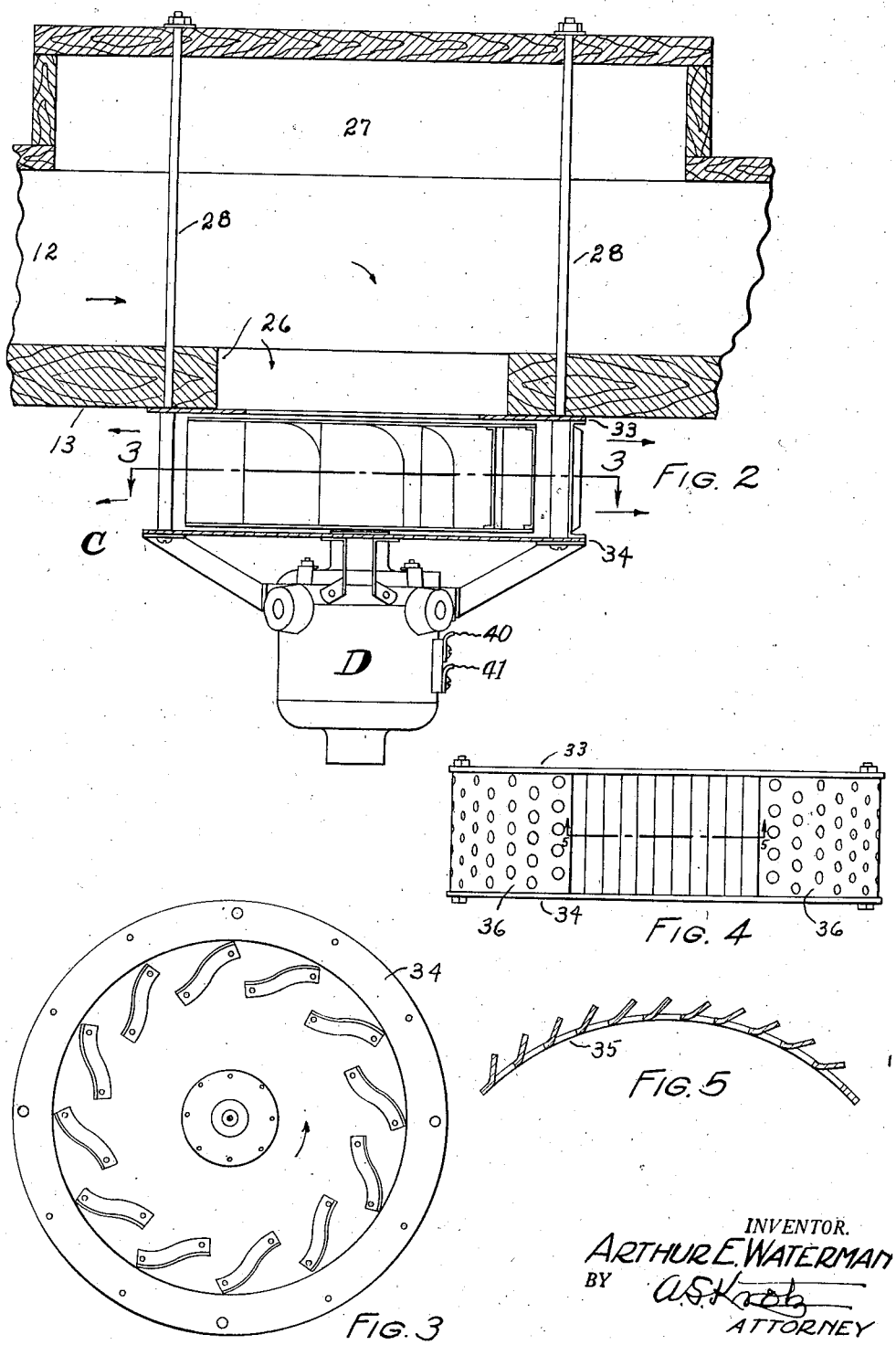

INVENTOR.
ARTHUR E. WATERMAN
BY
ATTORNEY

Patented July 25, 1944

2,354,292

UNITED STATES PATENT OFFICE 2,354,292

VENTILATING SYSTEM FOR POSITIVE AIR CONTROL IN BUILDINGS

Arthur E. Waterman, Fort Atkinson, Wis., assignor to James Manufacturing Company, Fort Atkinson, Wis., a company of Wisconsin Application June 23, 1941, Serial No. 399,299

2 Claims. (Cl. 98—33)

The present invention relates to a ventilating system for farm buildings and has for its object providing a simple, easily manufactured and easily installed system which is adapted to control the temperature and humidity of the air in the inclosure under all conditions of outside temperatures.

Ceiling heights of most farm buildings which house small animals and poultry are determined for convenience of the attendant. For this reason, ceilings are proportionally high above the animals or birds housed, which greatly increases the volume of air to be conditioned, and which also increases the wall surfaces through which valuable heat units may be dissipated.

In accordance with natural laws, the temperatures near the ceiling are usually much higher than temperatures near the floor or in the strata of air near the floor in which the live stock or birds exist.

For the above reasons, I often find that birds and animals are living in the region within a building in which conditions are least conducive to their well-being. I provide means whereby the foregoing conditions are largely eliminated as follows:

Means are provided whereby a large measure of control of the humidity is obtained and heat is conserved within the inclosure. I also provide means for convenient and safe automatic control in a system which can be readily incorporated into a dual heating and ventilating system whereby when the control is not artificial, circulation may be caused under natural laws.

An object of the present invention is to control the heat and humidity of the air in the inclosure by induction and distribution.

Another object of the present invention is to provide means whereby the circulating air may be heated, cooled and sterilized.

A still further object of the present invention is to provide means whereby the circulating air may be directed to segmented or optional areas within the inclosure.

Another object of the present invention is to provide means whereby the intake of outside air and the outgo of inside air is automatically controlled.

An important object of the present invention is to condition the air near the floor of the inclosure whereby all of the air in the inclosure may be maintained at a uniform temperature and humidity.

To these and other useful ends, my invention consists of parts, combinations of parts, or their equivalents, and mode of operation, as hereinafter set forth and claimed and shown in the accompanying drawings in which:

Fig. 1 is a transverse section through a conventional stock barn illustrating the outside air duct leading to the fan and parts associated therewith.

Fig. 2 is an enlargement of a detail of Figure 1.

Fig. 3 is a section on line 3—3 of Figure 2.

Fig. 4 is a side view of the fan equipped with zone directing segments.

Fig. 5 is an enlarged sectional view of one form of a segment taken on line 5—5 of Figure 4.

Figure 6:
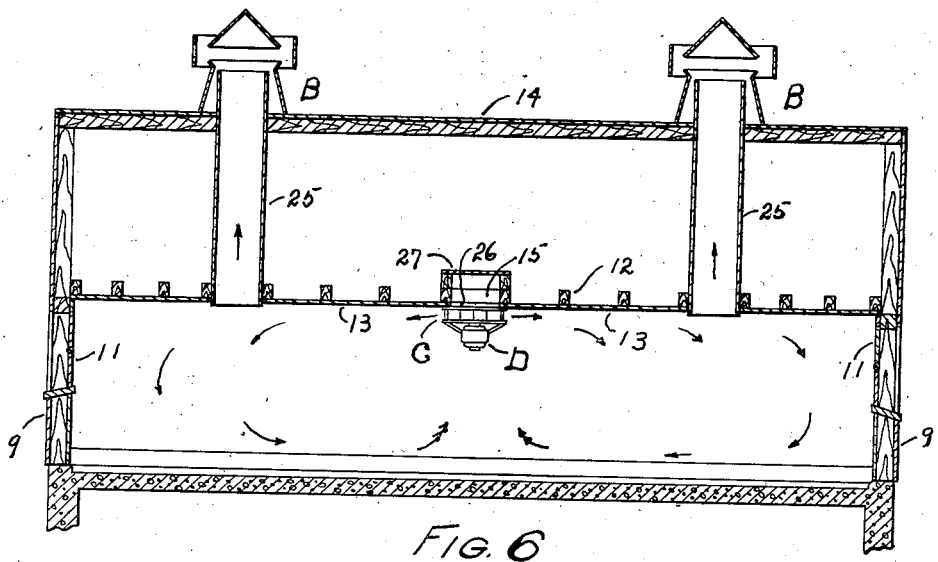
Fig. 6 is a longitudinal section of the building taken on line 6—6 of Figure 1.
Figure 7:
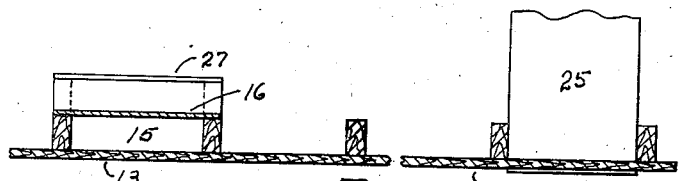
Fig. 7 is a longitudinal sectional view on line 7—7 of Figure 1 showing a fraction of one of the roof ventilators.

I have shown, in Figures 1 and 6, a barn having a length suitable for a single centrally positioned fan and having two roof ventilators spaced a distance longitudinally on opposite sides of the fan.

The building, as illustrated, is a conventional peaked roof dairy barn being arranged for two rows of animal stalls which are designated in their entireties by reference character A—A. The floor arrangement is too well known to require further description.

The end walls of the barn are designated by reference numerals 9—9 and the side walls by numerals 10—10. The side and end walls are preferably equipped with spaced windows as at 11, the building being supplied with ceiling rafters 12, ceiling 13 and a peaked roof 14. Windows 11 preferably comprise upper and lower sashes which are hinged at their centers as illustrated. In Figure 1 I have illustrated the top sash as being open by dotted lines. The sash illustrated in my Patent 2,271,930, February 3, 1942, illustrates the preferred form.

In the longitudinal center of the barn (see Figure 1), I illustrate an air duct 15 formed by ceiling 13 and a covering 16, the air duct having an inlet from the outside as at 17. The inlet is preferably formed in the top rail of the window frame (see Figure 1). Another inlet on the opposite side is provided, which terminates as at 18 and having an air receiving box 19 with a manually adjustable valve 20 whereby air may be received from the loft of the barn.

Clearly the air duct may extend to opposite sides of the barn or inlet 17 may be dispensed with and two boxes 19 supplied so all of the air discharged into the building from the duct will be received from the loft of the building, the loft having suitable inlets (not shown) preferably at the ends of the barn.

In a moderate sized barn, a single air duct and fan is all that is necessary. When one duct 15 only is used it will be placed preferably midway the length of the barn and roof ventilators are preferably provided, which in their entireties are designated by reference characters B. These ventilators are positioned preferably as illustrated in Figure 6.

Ventilators B are preferably provided with air ducts 25 which extend through ceiling 13. Thus, when the force draft is not in operation, as will hereinafter appear, the attendant may open windows 11 and permit ventilators B to cause circulation of the outside air through the inclosure.

I provide a centrifugal fan, which in its entirety is designated by reference character C, and a fan motor, which in its entirety is designated by reference character D. An opening 26 is formed in ceiling 13 and the air duct is enlarged as at 27. The fan and its motor are illustrated as being supported by bolts 28 which extend through the ceiling and through the cover of enlargement 27. Thus, it will be seen that when the fan is in operation, a partial vacuum will be formed in duct 15 and the air will be discharged around the periphery of the fan or directly below ceiling 13, the supply of outside air coming either through inlet 17 or from the loft through valve 20.

When the air is taken from the outside or from the loft, it is directed through the interior of the inclosure, as illustrated by single pointed arrows in Figures 1 and 6 and caused to flow back and join the air leaving the fan by syphoning effect, as illustrated by double pointed arrows.

Ventilators B will act to permit the surplus air to be discharged from the inclosure. When the fan is not in operation and windows 11 are open, the ventilators will cause a natural draft of air to pass through the inclosure. Thus it will be seen that I have provided a dual air controlling system.

Figure 8:
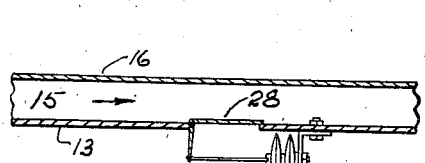
Fig. 8 is a sectional view of a fraction of the air duct illustrating the thermal means for controlling the temperature in the building.

In Figures 1 and 8, I illustrate a thermally controlled gate valve 28', which may act as a closure for opening 29' in the bottom of duct 15, as illustrated in Figure 8, and a closure for duct 15, as illustrated in Figure 1, the thermal device being designated by numeral 29 and having a connection to the valve as illustrated, so that when the temperature in the inclosure during very cold weather falls below a predetermined point, valve 28' will be moved more or less to the position shown in Figure 1 so as to receive less cold outside air. It will be understood that the valve and its opening are about the full width of duct 15. When this valve is fully raised, no outside air will be received but circulation in the inclosure will take place as before; however when value 28' is fully raised so it closes duct 15 very little air will be discharged through ventilators B. The air in the inclosure will be recirculated, entering hte duct through opening 29'.

This valve is largely useful for controlling the temperature of the inclosure when the outside temperature is very low, at which time it is usually advisable to move very little outside air into the inclosure. I provide electric resister coils 30—30 in the air ducts.

I elect to position heating or sterilizing means 31 in the air duct extension 32. Means (not shown) may also be provided in extension 32 for dehydrating the air. This heating, sterilizing or dehydrating means are positioned so all of the recirculated or outside air may be treated by simply closing valve 20.

Figure 9:
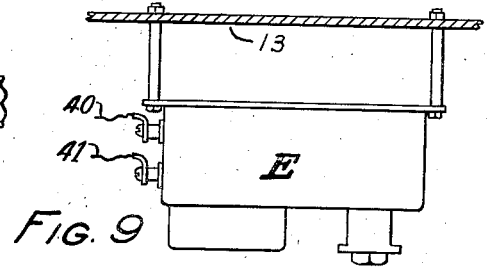
Fig. 9 is a sectional view showing a thermally controlled switch for controlling the motor.

In Figures 1 and 9, I illustrate a thermally controlled switch which in its entirety is designated by reference character E having wires 40 and 41 and forming a connection (not shown) to motor D whereby the motor will be caused to operate when the temperature of the barn rises above or falls below a predetermined point. In other words, the switch controls the motor on the "on" and "off" principle. Clearly resisters 30 may be disconnected and the connections between members E and D reversed so the motor operates when the temperature is above normal and will not operate when the temperature falls below normal.

Motor D is operated by switch E on the on and off principle which is well known. One of such means is shown and described in Patent Number 2,174,050, Sept. 26, 1939, W. M. Willett. The device acts simply to turn the motor on and off at predetermined temperatures.

An advantage of my improved device is that circulation may be natural or forced and the temperature may be controlled either automatically or manually.

In long buildings, clearly two fans and ducts may be provided in which natural draft ventilators will be positioned accordingly.

Referring now to Figures 3, 4 and 5. Clearly the space between the edges of fan plates 33 and 34 may be left open, as illustrated in Figure 2 so the air will be distributed equally around the periphery of the fan or the direction of the discharged air may be controlled by means of segments. These segments are preferably of a length whereby four or more will fully inclose the fan.

In Figures 4 and 5 I illustrate two kinds of segments 35 and 36. The object of these segments is to provide means for directing the air more or less toward certain zones in the inclosure. For example, if a far corner needed additional heat or air, a segment 35 would be positioned so as to direct the air in that direction. Segments 36 would then be used to restrict the air flow in the other directions or any combination of segments might be used to secure the desired distribution of air. It will be understood that the segments are removably positioned between plates 33 and 34. It will be understood that the use of segments 35 and 36 is optional. When it is desired to discharge the air evenly peripherally these segments may be dispensed with. Segments 36 will somewhat reduce the flow of air in the zone occupied by the segments and segment 35 illustrated in Figure 5 will not greatly reduce the flow of air but direct it tangentially; therefore, as illustrated in Figure 4, a single segment 35 may be positioned between two segments 36 to control the flow of air in a predetermined direction. By providing removable segments of various kinds, the direction of air flow into the inclosure can be adjusted to suit the animal requirements.

It will be seen that I have provided efficient means for recirculating the air in an inclosure and causing more or less outside air to enter the inclosure and that the volume of the air which is admitted into the inclosure will be discharged through the roof ventilators or that circulation may be caused by natural draft.

Clearly many minor detail changes may be made without departing from the spirit and scope of the present invention, as recited in the appended claims.

Having thus shown and described my invention, I claim:

1. A device of the class described, comprising a building inclosure having a substantially horizontally positioned ceiling, an air duct positioned generally above the ceiling and extending from the exterior of the building and having inclosure to a downwardly directed outlet positioned in the ceiling and substantially midway the sides of the building, an electrically operated cage type fan associated with said outlet having a vertically arranged axis with the cage of the fan positioned to thereby receive air from said outlet and discharge it circumferentially and horizontally in contact with the ceiling, a roof ventilator having an inlet adapted to receive air from the inclosure a distance from said fan, an opening from said inclosure into said air duct and being positioned a distance from said fan and from the inlet of the roof ventilator, a valve having a hinged support at the side of said opening toward the inlet end of said duct, a thermally controlled device associated with said valve and positioned adjacent the valve and within the enclosure having means to move the valve and more or less close the duct and said opening to thereby thermally control the percentage of outside to inside air entering the fan when the fan is operating.

2. A device as recited in claim 1 including; a thermally controlled switch positioned in said inclosure and having electrical connections to said motor and means whereby the motor will be controlled thermally on the on and off principle.

ARTHUR E. WATERMAN.